No. 645,824. Patented Mar. 20, 1900.
A. R. MARTIN.
COUPLING FOR AIR BRAKES.
(Application filed Oct. 28, 1899.)
(No Model.) 2 Sheets—Sheet 2.
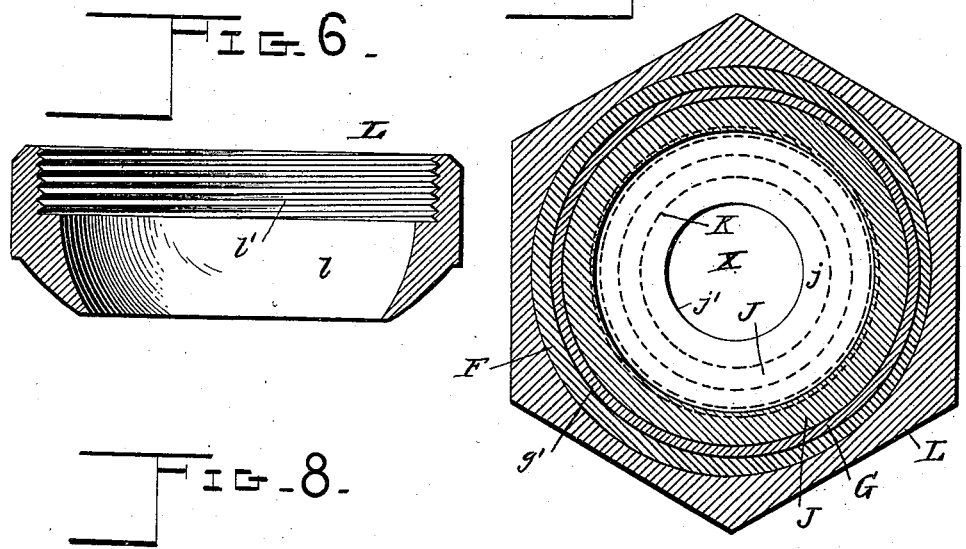
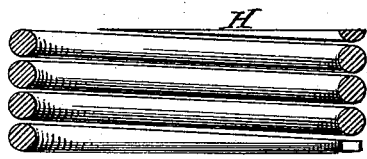
WITNESSES
INVENTOR
Albert R. Martin
by H. H. Bliss
Attorney

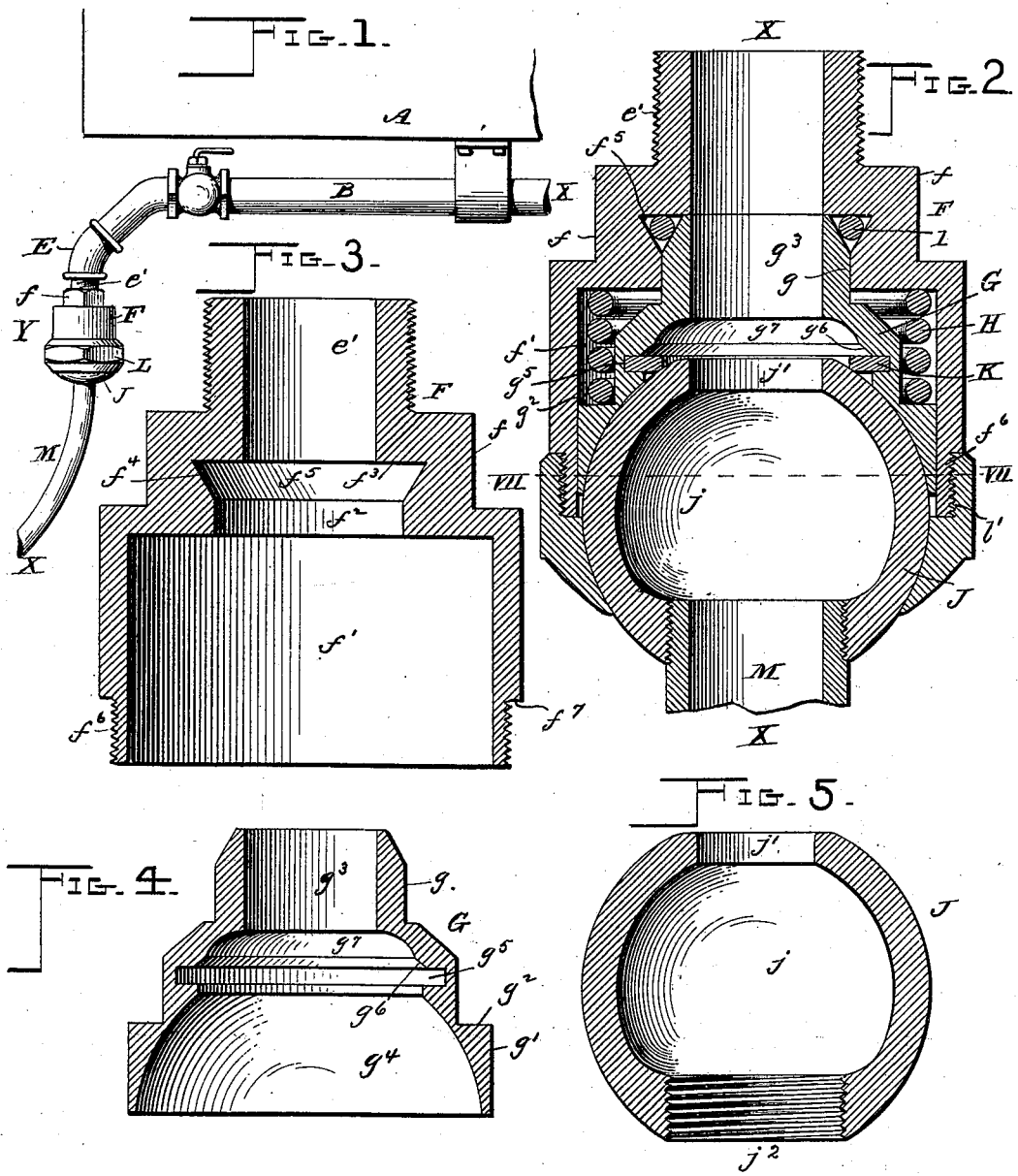
No. 645,824. Patented Mar. 20, 1900.
A. R. MARTIN.
COUPLING FOR AIR BRAKES.
(Application filed Oct. 28, 1899.)
(No Model.) 2 Sheets—Sheet 1.

UNITED STATES PATENT OFFICE.

ALBERT R. MARTIN, OF BEAVER FALLS, PENNSYLVANIA.

COUPLING FOR AIR-BRAKES.

SPECIFICATION forming part of Letters Patent No. 645,824, dated March 20, 1900.

Original application filed September 13, 1899, Serial No. 730,360. Divided and this application filed October 28, 1899. Serial No. 735,024. (No model.)

*To all whom it may concern:*

Be it known that I, ALBERT R. MARTIN, a citizen of the United States, residing at Beaver Falls, in the county of Beaver and State of Pennsylvania, have invented certain new and useful Improvements in Couplings for Air-Brakes and other Purposes, of which the following is a specification, reference being had therein to the accompanying drawings.
This application is a division of my application Serial No. 730,360, filed September 13, 1899, for a coupling for air-brakes and other purposes.

In order to make my invention more clearly understood, I have shown in the accompanying drawings means for carrying the same into practical effect without limiting my improvements in their useful applications to the particular constructions which for the sake of illustration I have delineated.

In said drawings, Figure 1 is a side elevation showing in diagram a portion of the end of a railway-car and train-pipe, the latter having a joint embodying my invention attached thereto. Fig. 2 is a longitudinal sectional view of the joint. Figs. 3 to 6 are similar sectional views of the several principal parts of the same separated. Fig. 7 is a transverse section on line VII VII, Fig. 2. Figs. 8, 9, and 10 are sectional views of the washer, packing-ring, and spring, respectively.

Referring to the drawings, Y indicates the joint as a whole, which I have shown as applied to the train-pipe B of a railway-car A, as a part of the fluid-pressure brake-duct X, and as a support upon which the coupler-pipe M may be carried and freely oscillate.

E is an internally-screw-threaded pipe, thimble, or elbow forming the terminal of the train-pipe and ordinarily extending downward therefrom.

F is a casing constituting an inclosing and holding device for the exterior or socket member of the joint and having at its end an exteriorly-threaded thimble or neck $e'$. The casing F may be formed with a nut-surface $f$ or other means whereby it may be readily manipulated and is also formed with an interior chamber $f'$, open at its lower end. Said chamber has an upward extension $f^2$ of smaller diameter, which terminates at a horizontal shoulder $f^3$. Contiguous to said shoulder the vertical walls of the extension $f^2$ are flared or inclined relative to the longitudinal axis of the casing, as shown at $f^4$, Fig. 3, forming a groove $f^5$. The lower end of the casing F is formed with a screw-thread $f^6$.

G is a socket-piece fitting within the casing F, having an upward extension $g$, which fits within the corresponding extension $f^2$ of the casing and also fitting the interior wall of the chamber $f'$ at its lower end by means of a bearing-surface $g'$. The latter surface terminates at a horizontal shoulder $g^2$, above which latter the socket-piece G is of less diameter than the interior of the casing, leaving a space in which is received a coiled spring H, which bears upward against the top of the chamber $f'$ and downward against the said shoulder $g^2$. Said spring is normally under tension and tends to press the socket-piece G toward the lower end of the casing F. The upper end of the socket-piece G is tubular, as shown at $g^3$, to form a portion of the continuous duct X through the whole coupling device. The outer wall of the extension $g$ is inclined or tapered oppositely to the incline $f^4$ of the casing, forming a space, within which is situated a packing-ring I of suitable material, such as vulcanized asbestos, lead, or other durable material. The fluid-pressure within the duct X tends constantly to seat the packing-ring I closely upon the said inclined walls of the casing and socket-piece and to wedge it between them, thus making the joint between said parts effectually airtight.

$g^4$ is a parti-spherical seat formed in the lower end of the socket-piece G, and above said seat the socket-piece is provided with a circular recess $g^5$, adapted to receive a washer or ring K of suitable material.

J is a ball having an interior chamber $j$, adapted to form a part of the continuous duct X by means of end openings $j'$ $j^2$. The outer surface of said ball is a more or less complete sphere, the upper portion of which corresponds with and fits within the seat $g^4$ of the socket-piece, the said seat and the exterior of the ball being formed on the same radius.

L is a supplemental socket-piece, preferably in the form of a ring or nut, having an interior parti-spherical surface $l$ of the same radius as the lower portion of the ball J and closely fitting the same. It is further provided with screw-threads $l'$, adapted to engage the thread $f^6$ of the casing F, whereby the supplemental socket-piece may be screwed upon the casing to such distance that the spring H will be compressed sufficiently to cause a close and air-tight but yielding contact between both socket-pieces and the surface of the ball. In order that the part L may be brought to a firm bearing on the casing, a shoulder $f^7$ is provided on the latter at the base of the thread $f^6$, against which shoulder the part L may be tightly screwed, the length of the screw-threaded surface being sufficient to allow first for the compression of the spring H for the purposes above described.

In ball-and-socket joints, especially when used for conducting steam, I have experienced great difficulty and damage to the joint from small particles of scale carried by the steam working between the bearing-surfaces of the ball and socket and acting to separate the parts of the joint and cause leakage and wear. This I have obviated by means of the washer K, already referred to. The recess or seat $g^5$ is formed in the socket-piece G, opposite the upper part of the ball J, in which seat is retained the annular cleaning-washer K, of asbestos or other suitable durable material. The latter rests on the bearing-surface of the ball J and excludes from the joint any scale or other foreign matter. Above the washer K the seat $g^5$ is cut away or enlarged, as shown at $g^6$, to admit the fluid-pressure in the duct X to the upper part of the washer and keep the latter in close engagement with the ball. Above the seat $g^4$ the part G is formed with a chamber $g^7$, of greater diameter than the opening $j'$ of the ball, whereby the latter may have sufficient play in its socket, according to the relative movements of the coupled cars, without cutting off or restricting the full area of the duct X.

In the original perfect condition of this joint it will be understood that the parts are made and finished with such accuracy that when the part L is screwed up to a firm bearing the upper end of the extension $g$ bears against the shoulder $f^3$ of the casing, but without any clamping action upon the ball J. Thereafter any wear of the ball and socket is constantly taken up by the spring H and a durable and perfect air-tight joint secured.

What I claim is—

1. In a joint for fluid-pressure ducts and other purposes, the combination of an interior or ball member having a through passage or chamber and adapted to be connected with a pipe, an external or socket member inclosing said ball and adapted to be connected with a pipe, said socket member comprising a casing having an internal shoulder, a supplemental socket-piece engaging said ball and secured to the casing, and a socket-piece fitting within the casing, movable longitudinally therein and having an external shoulder, and a spring interposed between said shoulders, substantially as set forth.

2. In a joint for fluid-pressure ducts and other purposes, the combination of an interior or ball member having a through passage or chamber and adapted to be connected with a pipe, an external or socket member inclosing said ball and adapted to be connected with a pipe, said socket member comprising a casing having two internal shoulders on different planes, a supplemental socket-piece engaging said ball and secured to the casing, and a socket-piece fitting within the casing, movable longitudinally therein and having two external shoulders opposing said shoulders of the socket-piece, a spring interposed between two of said opposing shoulders, and a ring I interposed between the other two of said opposing shoulders, substantially as set forth.

3. In a joint for fluid-pressure ducts and other purposes, the combination of an interior or ball member having a through passage or chamber and adapted to be connected with a pipe, an external or socket member inclosing said ball and adapted to be connected with a pipe, said socket member comprising a casing having an internal shoulder, a supplemental socket-piece engaging said ball and secured to the casing, and a socket-piece fitting within the casing, movable longitudinally therein and having an external shoulder and a seat $g^5$, a spring interposed between said shoulders, and a cleaning-washer K in said seat, substantially as set forth.

4. In a fluid-pressure coupling for railway-cars, the combination of the pipe M, and a ball-and-socket joint connected therewith, said joint comprising a casing, a movable socket-piece within said casing and having a seat $g^4$, a ball J, a supplemental socket-piece secured to said casing and coöperating with the first-mentioned socket-piece to hold the ball, and a cleaning-washer carried by the socket-piece above its seat and engaging the bearing-surface of the ball, substantially as set forth.

5. In a fluid-pressure coupling for railway-cars, the combination of a casing, having inclined walls $f^4$, a movable socket-piece therein having a seat $g^4$ and formed with a tapered end opposite said inclined walls, a ball engaging said seat, a supplemental socket-piece secured to said casing and engaging the ball, and a loose packing-ring between said inclined walls and the end of said socket-piece and adapted to follow the latter, substantially as set forth.

In testimony whereof I affix my signature in presence of two witnesses.

ALBERT R. MARTIN.

Witnesses:
CHRIS. SCHAUB,
W. J. DAVIDSON.